United States Patent
Saito et al.

(10) Patent No.: US 10,732,692 B2
(45) Date of Patent: Aug. 4, 2020

(54) ELECTRONIC DEVICE, POWER CONTROL METHOD, AND PROGRAM

(71) Applicant: Saturn Licensing LLC, New York, NY (US)

(72) Inventors: Itaru Saito, Tokyo (JP); Noritaka Otsuka, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 78 days.

(21) Appl. No.: 15/671,359

(22) Filed: Aug. 8, 2017

(65) Prior Publication Data

US 2017/0351313 A1    Dec. 7, 2017

Related U.S. Application Data

(63) Continuation of application No. 13/773,590, filed on Feb. 21, 2013, now Pat. No. 10,101,785.

(30) Foreign Application Priority Data

Feb. 28, 2012  (JP) ................................ 2012-040923

(51) Int. Cl.
  *G06F 1/3203* (2019.01)
  *G06F 1/3231* (2019.01)
(52) U.S. Cl.
  CPC .......... *G06F 1/3203* (2013.01); *G06F 1/3231* (2013.01); *Y02D 10/173* (2018.01)
(58) Field of Classification Search
  CPC .... G06F 1/3203; G06F 1/3231; Y02D 10/173
  See application file for complete search history.

(56) References Cited

U.S. PATENT DOCUMENTS

| | | | |
|---|---|---|---|
| 7,382,405 B2 | 6/2008 | Kusaka et al. | |
| 7,864,218 B2 | 1/2011 | Kusaka et al. | |
| 8,405,783 B2 | 3/2013 | Taya | |
| 8,482,634 B2 | 7/2013 | Kusaka et al. | |
| 8,804,006 B2 | 8/2014 | Kusaka et al. | |
| 9,094,585 B2 | 7/2015 | Iwase et al. | |

(Continued)

FOREIGN PATENT DOCUMENTS

| | | |
|---|---|---|
| CN | 1530796 A | 9/2004 |
| CN | 1757027 A | 4/2006 |

(Continued)

OTHER PUBLICATIONS

Japanese Office Action for JP Application No. 2012040923, dated Dec. 3, 2015.

(Continued)

*Primary Examiner* — Austin Hicks
(74) *Attorney, Agent, or Firm* — Lerner, David, Littenberg, Krumholz & Mentlik, LLP

(57) ABSTRACT

An electronic device includes an address acquisition unit that performs communication with an approaching communication terminal to acquire a unique address of the communication terminal, and a power control unit that shifts its own power state from a standby state where power is supplied only to a minimum function to a quick start state where power is supplied to a function other than a presentation function to a user, when the unique address acquired by the address acquisition unit matches a registered address.

22 Claims, 10 Drawing Sheets

(56) References Cited

U.S. PATENT DOCUMENTS

| | | |
|---|---|---|
| 2003/0135771 A1 | 7/2003 | Cupps et al. |
| 2007/0016809 A1* | 1/2007 | Kida .................. G06F 1/3203 |
| | | 713/300 |
| 2007/0214041 A1* | 9/2007 | Patel .................. G06Q 30/02 |
| | | 705/14.55 |
| 2010/0107196 A1* | 4/2010 | Kitayama .......... H04N 5/44543 |
| | | 725/46 |
| 2010/0310232 A1 | 12/2010 | Iwase et al. |
| 2011/0007901 A1 | 1/2011 | Ikeda et al. |
| 2011/0179300 A1 | 7/2011 | Suzuki et al. |
| 2012/0003932 A1 | 1/2012 | Zhodzishsky |
| 2012/0019674 A1 | 1/2012 | Ohnishi et al. |
| 2013/0227324 A1 | 8/2013 | Saito et al. |
| 2014/0340534 A1 | 11/2014 | Kusaka et al. |

FOREIGN PATENT DOCUMENTS

| | | |
|---|---|---|
| CN | 1940870 A | 4/2007 |
| CN | 101909151 A | 12/2010 |
| CN | 102103789 A | 6/2011 |
| CN | 102301738 A | 12/2011 |
| JP | 2003069912 A | 3/2003 |
| JP | 2003169247 A | 6/2003 |
| JP | 2008005341 A | 1/2008 |
| JP | 2008131360 A | 6/2008 |
| JP | 2009124896 A | 6/2009 |
| JP | 2010277010 A | 12/2010 |
| JP | 2013178604 A | 9/2013 |
| WO | 2007026532 A1 | 3/2007 |
| WO | 2011037761 A1 | 3/2011 |

OTHER PUBLICATIONS

Japanese Office Action for JP Application No. 2012040923, dated Feb. 23, 2016.

Chinese Office Action for Application No. 201310055349.0, dated Jan. 13, 2017.

Japanese Office Action for JP Application No. 2016-117060, dated Aug. 1, 2017.

* cited by examiner

FIG. 7

| UNIQUE ADDRESS | USER | PREFERENCE INFORMATION |
|---|---|---|
| UNIQUE ADDRESS A | FATHER | GOLF, GOLFER NAME |
| UNIQUE ADDRESS B | MOTHER | KOREA, DRAMA, ACTOR NAME |
| UNIQUE ADDRESS C | DAUGHTER | SONG, COMEDY, IDOL NAME |

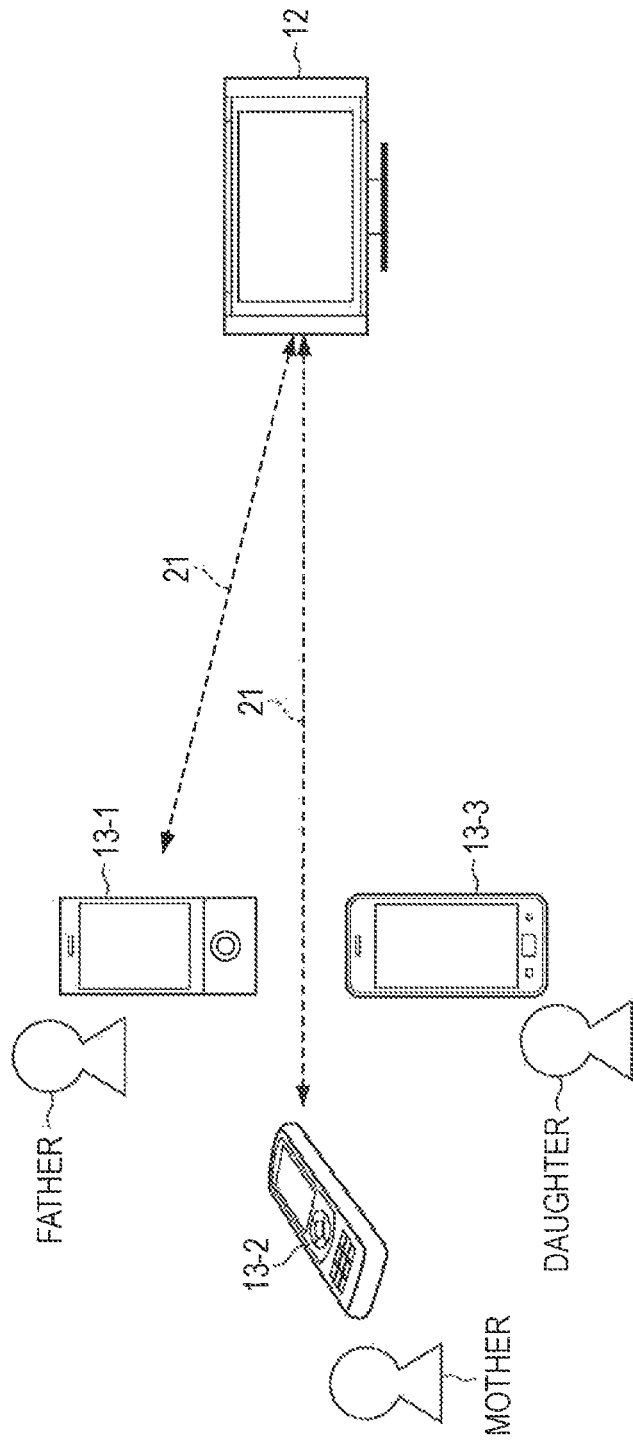
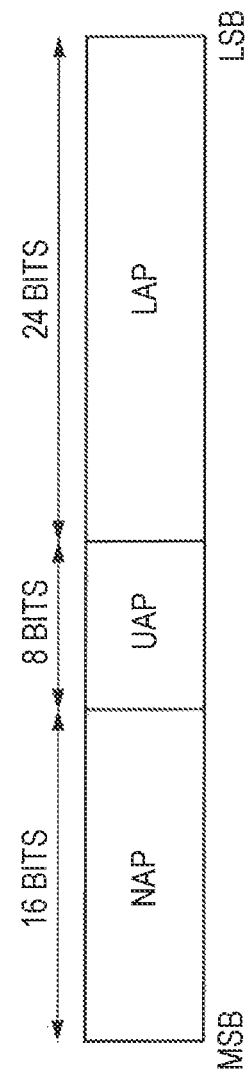

ELECTRONIC DEVICE, POWER CONTROL METHOD, AND PROGRAM

CROSS-REFERENCES TO RELATED APPLICATIONS

This application is a continuation of U.S. application Ser. No. 13/773,590, filed on Feb. 21, 2013, which claims priority from Japanese Patent Application No. JP 2012-040923 filed in the Japanese Patent Office on Feb. 28, 2012, the entire contents of which are incorporated herein by reference.

BACKGROUND

The present disclosure relates to an electronic device, a power control method, and a program, and particularly, to an electronic device, a power control method, and a program which may enable a quick start of the electronic device through the proximity of a user.

In Japanese Unexamined Patent Application Publication No. 2008-005341, there is proposed a power management system that shifts an operating state of power supply to a standby state or an ON state linked with a user's going outside and returning home.

In Japanese Unexamined Patent Application Publication No. 2003-169247, there is proposed a method in which, when using an electronic apparatus, a user performs wireless communication with an electronic device where user personal information possessed by the user is stored, so that the user personal information is read by the electronic apparatus through the communication, and then, in the electronic apparatus, a customized setting is executed according to the user based on the personal information.

SUMMARY

However, in the proposal described in Japanese Unexamined Patent Application Publication No. 2008-005341, since radio waves which have weaker directivity than infrared rays and for which adjustment is easy are used to detect the user's going outside and returning home, there is a possibility that erroneous detection may occur even in the device of another in the case of the same mobile terminal or wireless method.

On the other hand, in the proposal described in Japanese Unexamined Patent Application Publication No. 2003-169247, even though erroneous detection may not occur in the mobile terminals of another user, an individual user is specified by exchanging personal information, and therefore there is a possibility that personal information may be exchanged with the outside against user's intention.

It is desirable to provide an electronic device which may enable a quick start of the electronic device through the proximity of the user.

According to an embodiment of the present disclosure, there is provided an electronic device including: an address acquisition unit that performs communication with an approaching communication terminal to acquire a unique address of the communication terminal; and a power control unit that shifts its own power state from a standby state where power is supplied only to minimum functions to a quick start state where power is supplied to functions other than a function presenting to a user, when the unique address acquired by the address acquisition unit matches a registered address.

When a user operation is performed after its own power state is shifted to the quick start state, the power control unit may shift its own power state to an ON state where power is supplied to all functions.

When its own power state is shifted to the quick start state and then the user operation is not performed for a predetermined time, the power control unit may shift its own power state to the standby state.

When its own power state is shifted to the ON state and then the communication with the communication terminal is disconnected, the power control unit may shift its own power state to the quick start state.

The electronic device may further include a preference information storage unit that stores user preference information in association with the unique address of the communication terminal; and an information providing unit that extracts information in accordance with the user preference information stored in the preference information storage unit in association with the acquired unique address when the unique address acquired by the address acquisition unit matches the registered address, and provides the extracted information when its own power state is shifted to the ON state by the user operation.

The electronic device may further include a provision information storage unit that stores information providing to the user in association with a part of the unique address of the communication terminal; and an information providing unit that extracts the information stored in the provision information storage unit in association with a part of the acquired unique address when the unique address acquired by the address acquisition unit matches the registered address, and provides the extracted information when its own power state is shifted to the ON state by the user operation.

The presentation function may be an image display unit that displays an image and an audio output unit that outputs audio data.

According to another embodiment of the present disclosure, there is provided a power control method including: performing, by an electronic device, communication with an approaching communication terminal to acquire a unique address of the communication terminal; and shifting its own power state from a standby state where power is supplied only to a minimum function to a quick start state where power is supplied to a function other than a presentation function to a user, when the acquired unique address matches a registered address.

According to still another embodiment of the present disclosure, there is provided a program which causes a computer to function as: an address acquisition unit that performs communication with an approaching communication terminal to acquire a unique address of the communication terminal; and a power control unit that shifts its own power state from a standby state where power is supplied only to a minimum function to a quick start state where power is supplied to a function other than a presentation function to a user, when the unique address acquired by the address acquisition unit matches a registered address.

In the embodiments of the present disclosure, the unique address of the communication terminal may be acquired by performing the communication with the approaching communication terminal. When the acquired unique address matches the registered address, its own power state may be shifted from the standby state where power is supplied only to the minimum function to the quick start state where power is supplied to the function other than the presentation function to a user.

According to the embodiments of the present disclosure, it is possible to start the electronic device. In particular, it is possible to quickly start the electronic device through the proximity of the user.

BRIEF DESCRIPTION OF THE DRAWINGS

FIG. 7 is a drawing showing an example of a preference information storage unit;

FIG. 10 is a drawing showing an operation example of a receiving device by a mobile terminal;

FIG. 11 is a drawing showing a unique address; and

DETAILED DESCRIPTION OF EMBODIMENTS

Hereinafter, an embodiment (hereinafter, referred to as embodiment) for carrying out the present disclosure will be described.

Configuration Example of Receiving Device

Figure 1:
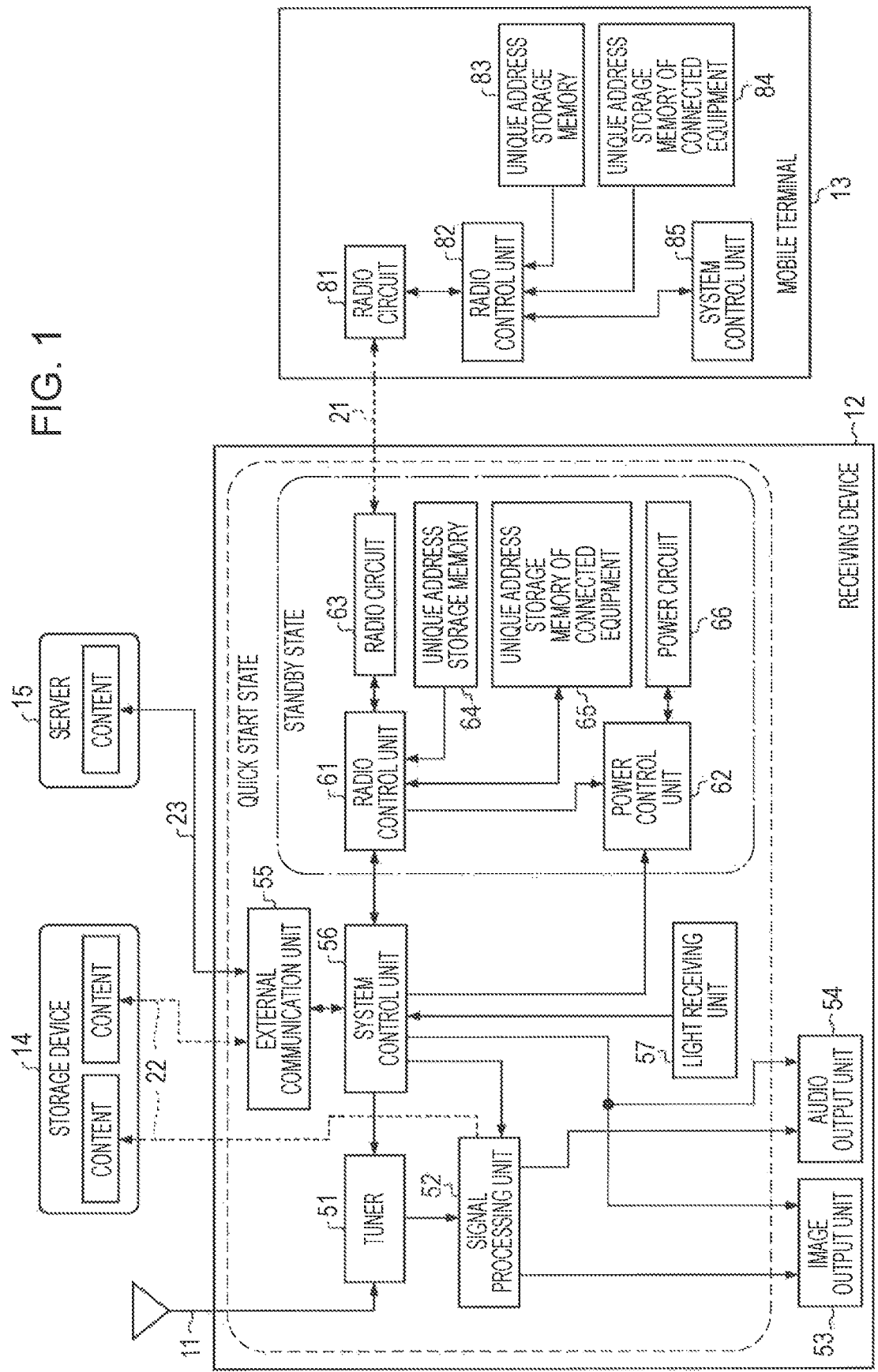
FIG. 1 is a block diagram showing a configuration example of a radio communication system to which the present disclosure is applied.

FIG. 1 is a drawing showing a configuration example of a radio communication system including a receiving device as an electronic device to which the present disclosure is applied.

A radio communication system shown in FIG. 1 includes an antenna 11, a receiving device 12, a mobile terminal 13, a recording device 14, and a server 15.

The receiving device 12 receives and selects broadcast signals from a broadcast device, which is not shown, via the antenna 11, and displays an image corresponding to the broadcast signals and outputs a audio corresponding to the broadcast signals.

The receiving device 12 is connected to the mobile terminal 13 existing in a communicable range in a wireless manner, by a radio communication 21. The receiving device 12 is connected to the recording device 14 by a network 22 such as the Digital Living Network Alliance (DLNA) or high-definition multimedia interface (HDMI). In addition, the receiving device 12 is connected to the server 15 by the Internet 23 or the like.

The receiving device 12 includes a tuner 51, a signal processing unit 52, an image output unit 53, an audio output unit 54, an external communication unit 55, a system control unit 56, and a light receiving unit 57. In addition, the receiving device 12 includes a radio control unit 61, a power control unit 62, a radio circuit 63, a unique address storage memory 64, a unique address storage memory 65 of a connected device, and a power supply circuit 66.

The tuner 51 extracts broadcast signals corresponding to the selection of a user, from the broadcast signals received via the antenna 11, demodulates the extracted signals, generates a transport stream (TS), and supplies the transport stream to the signal processing unit 52.

The signal processing unit 52 appropriately cancels scrambling of the transport stream input from the tuner 51, and divides the multiplexed transport stream into a stream such as image or audio data, or section data. The signal processing unit 52 performs decoding with respect to the divided image data, and adds (superimposes) data broadcast data or the like, as necessary, to thereby display the image data on the image output unit 53. The signal processing unit 52 performs decoding with respect to the divided audio data, and displays the audio data on the audio output unit 54. In addition, the signal processing unit 52 records, in the recording device 14, the divided image data and audio data as content.

In addition, the signal processing unit 52 stores, in an EPG storage unit 112 (FIG. 6) or the like, electronic program guide (EPG) information among the divided section data. The signal processing unit 52 prepares display using content information from the system control unit 56 or information of the EPG, and displays the prepared display on the image output unit 53.

The image output unit 53 is one of functions presented from the receiving device 12, and displays an image corresponding to data from the signal processing unit 52. The audio output unit 54 is one of the functions presented from the receiving device 12, and outputs a audio corresponding to data from the signal processing unit 52. The presentation function is a function of performing some presentation to a user.

The external communication unit 55 performs communication with the recording device 14 via the network 22 under control of the system control unit 56, and browses desired content from content stored in the recording device 14. In addition, the external communication unit 55 performs communication with the server 15 via the Internet 23 under the control of the system control unit 56, and browses desired content from content stored in the server 15.

The system control unit 56 controls each unit of the receiving device 12 in response to user operations input via a program developed in a RAM, which is not shown, or the light receiving unit 57. For example, the system control unit 56 shifts the power supply state of the receiving device 12 by controlling the power control unit 62 in response to the user operations input via the light receiving unit 57 or the like.

The light receiving unit 57 receives infrared rays from a remote controller which is not shown, and supplies signals corresponding to the user operation to the system control unit 56.

The radio control unit 61 performs communication with the mobile terminal 13 by controlling the radio circuit 63, and performs pairing in advance. In the pairing, its own unique address is sent from the unique address storage memory 64 to the mobile terminal 13, and the unique address from the mobile terminal 13 is stored in the unique address storage memory 65 of the connected device.

The unique address is an address provided in a wireless function such as Bluetooth (registered trademark) or WiFi (registered trademark).

The radio control unit 61 performs communication with an approaching mobile terminal 13 by controlling the radio circuit 63, and acquires a unique address from the mobile terminal 13. When the acquired unique address matches the address stored in the unique address storage memory 65 of the connected device, the radio control unit 61 shifts a power supply state of the receiving device 12 to a quick start state in the power control unit 62.

Here, the power supply state of the receiving device 12 includes three states such as a standby state, a quick start state, and an ON state.

The standby state is a state where power is supplied only to a minimum function for the waiting of the mobile terminal 13. Within the dashed line in FIG. 1, a starting unit in the standby state is shown. Specifically, in the standby state, as shown in the dashed line of FIG. 1, power is supplied to the radio control unit 61, the power control unit 62, the radio circuit 63, the unique address storage memory 64, the unique address storage memory 65 of the connected device, and the power supply circuit 66.

The quick start state is a state where power is supplied to most of the units constituting the receiving device 12 so as to start the electronic device, but is a state that as appears to be the standby state to a user. That is, the quick start state is a state where power is supplied to functions other than presentation functions to a user. Within a dotted line of FIG. 1, the starting unit in the quick start state is shown. In the quick start state, as shown in the dotted line of FIG. 1, power is supplied to each unit other than the image output unit 53 and the audio output unit 54 which are the presentation functions. Specifically, in the quick start state, power is supplied to the tuner 51, the signal processing unit 52, the external communication unit 55, the system control unit 56, and the light receiving unit 57 other than each unit which is started in the standby state. In addition, the presentation functions are not limited only to the image output unit 53 and the audio output unit 54, and may include any function as long as the function presents something to a user. For example, the presentation function may include a lamp for presenting ON/OFF of power supply to a user.

The ON state is a state where all units of the receiving device 12 are started to provide an image or a audio to a user. Specifically, in the ON state, other than each unit that is started in the quick start state, power is supplied to the image output unit 53 and the audio output unit 54.

In addition, practically, main power is turned off as the power supply state of the receiving device 12, so that there is an OFF state of the main power where power is not supplied to all units of the receiving device 12. Hereinafter, the case of the OFF state of the main power is referred to as main power which will be described.

The radio control unit 61 shifts the power supply state of the receiving device 12 by controlling the power control unit 62 in response to whether the mobile terminal 13 is in a wireless communicable range.

The power control unit 62 shifts the power supply state of the receiving device 12 by controlling the power supply circuit 66 under a control from the radio control unit 61 or a control from the system control unit 56.

The radio circuit 63 performs communication with the mobile terminal 13 that is present in the communicable range of the radio communication 21 under a control of the radio control unit 61. For example, the radio circuit 63 sends its own address from the radio control unit 61 to the mobile terminal 13, acquires a unique address of the mobile terminal 13, and supplies the acquired unique address to the radio control unit 61.

The unique address storage memory 64 stores its own unique address. In addition, the unique address storage memory 64 stores information such as functions corresponding to the unique address storage memory 64, or the like. The unique address storage memory 65 of the connected device stores even a unique address of a connected device such as a paired mobile terminal 13. The unique address storage memory 65 of the connected device stores even information such as functions corresponding to the connected device.

The power circuit 66 supplies power to a unit in accordance with a control of the power control unit 62 among each unit of the receiving device 12.

The mobile terminal 13 is formed to be portable. The mobile terminal 13 is a high-performance mobile terminal in which a mobile phone called a smart phone and a mobile information terminal are fused, and has excellent mobility. In addition, the mobile terminal 13 may be a tablet terminal or a mobile phone, and may be a mobile personal computer (PC). The mobile terminal 13 includes a radio circuit 81, a radio control unit 82, a unique address storage memory 83, a unique address memory 84 of a connected device, and a system control unit 85. In addition, in the example of FIG. 1, only functional units of the mobile terminal 13 which are used for implementing the present disclosure are described.

The radio circuit 81 performs communication with the receiving device 12 that is present in the communicable range via the radio communication 21, under a control of the radio control unit 82. For example, the radio circuit 81 sends its own unique address from the radio control unit 82 to the receiving device 12 to acquire the unique address of the receiving device 12, and supplies the acquired unique address to the radio control unit 82.

The unique address storage memory 83 stores its own unique address. In addition, the unique address storage memory 83 also stores information such as functions corresponding to the unique address storage. The unique address storage memory 84 of the connected device stores a unique address of the connected device such as the paired receiving device 12. In addition, the unique address storage memory 84 of the connected device also stores information such as functions corresponding to the connected device.

The system control unit 85 controls each unit of the mobile terminal 13 in association with user operations which are input via a program developed in a RAM which is not shown, or an operation unit which is not shown.

The recording device 14 may be composed of a Blu-ray disc recorder, a personal computer, or a hard disk drive. The recording device 14 is connected to the receiving device 12 by the network 22, and records content from the receiving device 12. In addition, the content stored in the recording device 14 is searched and acquired by the receiving device 12 via the network 22.

The server 15 is a network server connected to the Internet 23. The server 15 is connected to the receiving device 12 by the Internet 23 and stores content. The content stored in the server 15 is retrieved and acquired by the receiving device 12 via the Internet 23. In addition, the server itself may not store the content, and the server may be available as long as the server enables the retrieval and acquisition of information of the content, for example, the server provides Web services such as a search engine.

In addition, in the example of FIG. 1, an example in which the recording device 14 is provided in the outside of the receiving device 12 has been described, but a hard disk drive or the like may be provided in the interior of the receiving device 12.

Example of Pairing

Next, a pairing process that is an initial operation for connecting the mobile terminal 13 and the receiving device 12 through the radio communication 21 will be described with reference to the flowchart of FIG. 2.

First, a user performs a pairing process for registering mutual unique addresses with respect to the receiving device 12 by enabling the mobile terminal 13 to approach the receiving device 12.

In step S11, the radio control unit 61 of the receiving device 12 performs paging (searching) with respect to the communicable range of the radio communication 21 by controlling the radio circuit 63. In this instance, the radio control unit 61 sends, to the radio circuit 63, its own unique address read from the unique address storage memory 64.

The radio circuit 81 of the mobile terminal 13 receives a unique address of the receiving device 12 via the radio communication 21, and supplies the received unique address to the radio control unit 82. The radio control unit 82 reads the unique address of the receiving device 12 from the radio circuit 81, and stores the read unique address in the unique address storage memory 84 of the connected device.

Next, in step S21, the radio control unit 82 controls the radio circuit 81 to perform response with respect to the receiving device 12. In this instance, the radio control unit 82 reads its own unique address from the unique address storage memory 83, and sends the read unique address to the radio circuit 81.

The radio circuit 63 of the receiving device 12 receives a unique address of the mobile terminal 13 via the radio communication 21, and supplied the received unique address to the radio control unit 61. The radio control unit 61 stores the unique address of the mobile terminal 13 from the radio circuit 63 in the unique address storage memory 64 of the connected device.

Next, in step S12, the radio control unit 61 performs a query with respect to the mobile terminal 13 by controlling the radio circuit 63. That is, the radio control unit 61 asks the mobile terminal 13 about to which function corresponds.

The radio circuit 81 of the mobile terminal 13 receives the inquiry of the receiving device 12 via the radio communication 21, and supplies the received inquiry to the radio control unit 82. In step S22, the radio control unit 82 performs response corresponding to the inquiry from the radio circuit 81. That is, the radio control unit 82 reads, from the unique address storage memory 83, information (information of corresponding function) corresponding to the inquiry from the radio circuit 81, and sends the read information to the radio circuit 81.

The radio circuit 63 of the receiving device 12 receives the response corresponding to the inquiry via the radio communication 21, and supplies the received response to the radio control unit 61. The radio control unit 61 stores information corresponding to the inquiry of the mobile terminal 13 from the radio circuit 63 in the unique address storage memory 64 of the connected device.

Next, in step S13, the radio control unit 61 controls the radio circuit 63 to perform an authentication request with respect to the mobile terminal 13. The radio circuit 81 of the mobile terminal 13 receives the authentication request of the receiving device 12 via the radio communication 21, and supplies the received authentication request to the radio control unit 82. In step S23, the radio control unit 82 performs response corresponding to the authentication request from the radio circuit 81. In the authentication request, a user is requested to input a number such as a pin code, and therefore information of the pin code input by the user is sent to the receiving device 12 as the response corresponding to the authentication request.

The radio circuit 63 of the receiving device 12 receives the response corresponding to the authentication request via the radio communication 21, and supplies the received response to the radio control unit 61. The radio control unit 61 receives the response corresponding to the authentication request, and in step S14, is connected with the mobile terminal 13 by the radio communication 21. Corresponding to this, in step S24, the mobile terminal 13 is also connected with the receiving device 12 by the radio communication 21.

By the above-described pairing process, the unique addresses are mutually registered. Therefore, in the following processes, the unique address that the mobile terminal connected by the radio communication 21 has may be specified. In addition, an example of FIG. 2 is merely an example, and when inquiry or authentication is not used, steps of FIG. 2 will be omitted.

Power Supply State Shift Diagram

Figure 3:
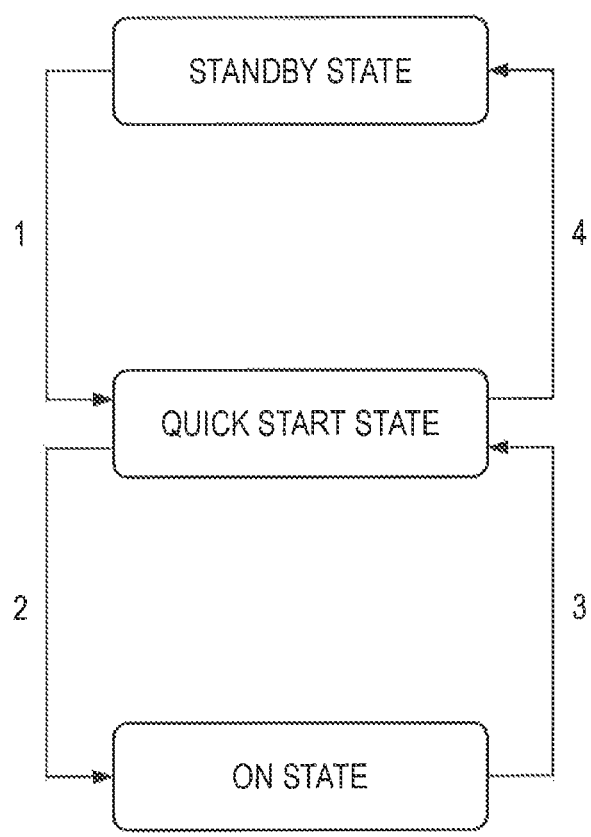
FIG. 3 is a drawing showing shift of a power supply state of a receiving device.

FIG. 3 is a drawing showing shift of a power supply state of the receiving device 12.

First, it is assumed that the power supply state of the receiving device 12 is a standby state. In this instance, in the receiving device 12, as shown in the dashed line, power is supplied to the starting unit in the standby state. That is, power is supplied to the radio control unit 61, the power control unit 62, the radio circuit 63, the unique address storage memory 64, the unique address storage memory 65 of the connected device, and the power supply circuit 66.

In the standby state, the radio circuit 63 regularly monitors peripheral radio waves, and detects proximity or disappearance (due to being outside the communicable range or having its power turned off) of the mobile terminal. When a mobile terminal 13 that has been paired in advance is not present in the surroundings, the receiving device 12 is maintained in the standby state.

In the standby state, when the mobile terminal 13 is detected by the paired unique address, the power supply state is shifted to a quick start state as shown by an arrow 1. Accordingly, in the receiving device 12, as shown in a dotted line, power is supplied to the tuner 51, the signal processing unit 52, the external communication unit 55, the system control unit 56, and the light receiving unit 57 as the starting units in the quick start state, other than the starting units in the standby state.

When turning on of the power is detected by a user operation in the quick start state, the power supply state is shifted to an ON state as shown by an arrow 2. Corresponding to this, in the receiving device 12, power is supplied to the image output unit 53 and the audio output unit 54 other than the starting units in the quick start state.

Therefore, for example, when a user turns on the receiving device 12 by operating a remote controller (not shown) after returning home, images and audios are output immediately without stress being felt by the user waiting for the start of the receiving device 12 from the standby state. In addition, an operation such as switching channels is performed as soon as possible, a reaction is returned immediately.

After returning home, in a case where the user goes to sleep without watching the receiving device 12, the receiving device 12 is maintained in the quick start state, and power consumption becomes larger.

Therefore, a time (for example, 30 minutes) for maintaining the quick start state after detecting user's proximity is made settable. Thus, the power supply state of the receiving device 12 is shifted to the quick start state by the proximity of the mobile terminal 13 after the user returns home, and for example, when an ON operation is not performed with respect to the receiving device 12 within 30 minutes, the power supply state is shifted to the standby state. As a result, it is possible to reduce power consumption.

In addition, when power off is detected by a user operation in the ON state, or when the mobile terminal 13 disappears from a communicable range of the radio communication 21, as shown by an arrow 3, the power supply state is shifted to the quick start state. Therefore, in the receiving device 12, power supply to the image output unit 53 and the audio output unit 54 is stopped.

In addition, here, "the disappearance of the mobile terminal 13 from the communicable range of the radio communication 21" means that the mobile terminal 13 is outside the communicable range, power to the mobile terminal 13 is turned off, or communication with the mobile terminal 13 is disconnected.

Obviously, since there is a case in which a single user of the family leaves his seat carrying the mobile terminal 13 during the family views the receiving device 12, the receiving device 12 may have a function of disabling the shift to the standby state occurring due to the disappearance of the mobile terminal 13.

Meanwhile, when a user operation is not detected in the quick start state for a predetermined time, the power supply state is shifted to the standby state as shown by an arrow 3. Therefore, in the receiving device 12, the power supply to the tuner 51, the signal processing unit 52, the external communication unit 55, the system control unit 56, and the light receiving unit 57 is stopped.

Example of Power Supply State Control Process

Figure 4:
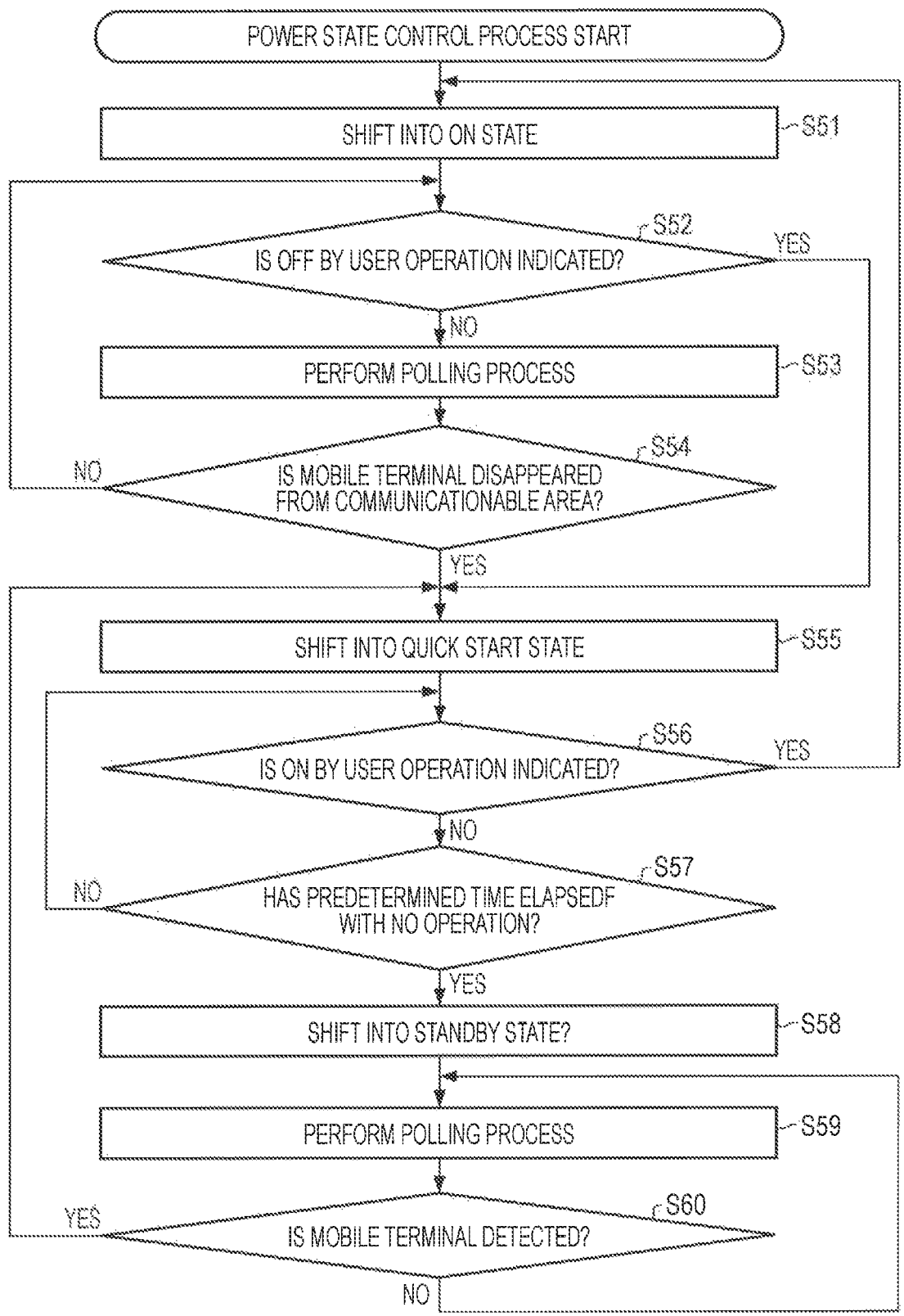
FIG. 4 is a flowchart showing a power state control process of a receiving device.

Next, a power supply state control process of the receiving device 12 will be described with reference to a flowchart of FIG. 4. In addition, the power supply state control process is a process that is terminated when main power is turned off by a user.

For example, a user turns on main power to the receiving device 12 by operating the remote controller which is not shown. The light receiving unit 57 receives infrared rays from the remote controller, and supplies signals corresponding to a user operation to the system control unit 56. In step S51, the system control unit 56 shifts the power supply state to an ON state by controlling the power control unit 62.

In step S52, the system control unit 56 determines whether turning off operation is instructed by a user operation. In step S52, when the OFF by the user operation is determined to be instructed, the process proceeds to step S55.

In step S52, when the OFF by the user operation is determined not to be instructed, the process proceeds to step S53. In step S53, the radio control unit 61 performs a polling process with respect to the communicable range of the radio communication 21 by controlling the radio circuit 63. In this instance, the radio control unit 61 sends, to the radio circuit 63, its own unique address read from the unique address storage memory 64.

In step S54, the radio control unit 61 determines whether the mobile terminal 13 disappears from the communicable range of the radio communication 21.

For example, when the mobile terminal 13 is in the communicable range of the radio communication 21 and receives the unique address of the receiving device 12, the unique address of the receiving device 12 is supplied from the radio circuit 81 to the radio control unit 82. When an address that matches the unique address of the receiving device 12 is stored in the unique address storage memory 84 of the connected device, the radio control unit 82 reads the unique address of the mobile terminal 13 from the unique address storage memory 83. The radio control unit 82 transmits the read unique address of the mobile terminal 13 via the radio circuit 81.

When receiving the unique address of the mobile terminal 13, the radio circuit 63 of the receiving device 12 supplies the received unique address to the radio control unit 61, and the radio control unit 61 determines whether the supplied unique address is stored in the unique address storage memory 65 of the connected device.

When the unique address is stored in the unique address storage memory 65 of the device, the radio control unit 61 determines that the mobile terminal 13 is not disappeared from the communicable range in step S54, the process returns to step S52, and then the following process is repeatedly performed.

Meanwhile, when the mobile terminal 13 is not in the communicable range of the radio communication 21, the unique address of the mobile terminal 13 is not transmitted, and therefore the mobile terminal 13 is determined to have disappeared from the communicable range in step S54. As a result, the process proceeds to step S55.

That is, when it is determined as YES in step S52, or when it is determined as NO in step S54, the radio control unit 61 shifts the power supply state to the quick start state as shown in the arrow 3 of FIG. 3 by controlling the power control unit 62 in step S55.

In step S56, the system control unit 56 determines whether turning on is instructed by a user operation. In step S56, when the ON by the user operation is determined to be instructed, the process returns to step S51, and repeatedly performs the following process. That is, in this case, in step S51, the power supply state is shifted to an ON state as shown in the arrow 2 of FIG. 3.

In addition, when the OFF by the user operation is determined to be instructed in step S56, the process proceeds to step S57. In step S57, the system control unit 56 determines whether a predetermined time elapses without an operation by the user.

In step S57, when it is determined that the predetermined time does not elapse without an operation by the user, the process returns to step S56, and repeatedly performs the following process. In step S57, when it is determined that the predetermined time elapses without the operation by the user, the process proceeds to step S58.

That is, when it is determined as YES in step S57, the radio control unit 61 shifts the power supply state to the standby state by controlling the power control unit 62, as shown by an arrow 4 of FIG. 3 in step S58.

In step S59, the radio control unit 61 performs a polling process with respect to the communicable range of the radio communication 21 by controlling the radio circuit 63. In this instance, the radio control unit 61 sends, to the radio circuit 63, its own unique address read from the unique address storage memory 64.

In step S60, the radio control unit 61 determines whether the mobile terminal 13 is detected.

For example, when the mobile terminal 13 is in the communicable range of the radio communication 21 and receives the unique address of the receiving device 12, the unique address of the receiving device 12 is supplied from the radio circuit 81 to the radio control unit 82. When the address that matches the unique address of the receiving device 12 is stored in the unique address storage memory 84 of the connected device, the radio control unit 82 reads the unique address of the mobile terminal 13 from the unique address storage memory 83. The radio control unit 82 transmits the read unique address of the mobile terminal 13 via the radio circuit 81.

When receiving the unique address of the mobile terminal 13, the radio circuit 63 of the receiving device 12 supplies the received unique address to the radio control unit 61, and the radio control unit 61 determines whether the supplied unique address is stored in the unique address storage memory 65 of the connected device.

In step S60, when the unique address is stored in the unique address storage memory 65 of the connected device, the radio control unit 61 determines that the mobile terminal 13 is detected, and the process returns to step S55 and repeats the following process. That is, in this case, in step S55, the power supply state is shifted to the quick start state as shown in the arrow 1 of FIG. 3.

In addition, in step S60, when it is determined that the mobile terminal 13 is detected, the process returns to step S59 and repeats the following process.

As described above, since the detection of the mobile terminal 13 is performed using the unique address of a wireless function, it is possible to suppress erroneous detection of the mobile terminal 13 having the same type or the same model. In addition, the detection of the unique address is information collection enabled by existing disclosure of wireless function such as Bluetooth (registered trademark) or WiFi (trademark), and therefore it is not necessary to newly incorporate a communication function.

In addition, next, in the radio communication system of FIG. 1, an example in which unique addresses of a plurality of mobile terminals 13 are held in the receiving device 12, and unique information is associated with paired unique addresses will be described with respect to FIG. 5.

Application Example of Radio Communication System

Figure 5:
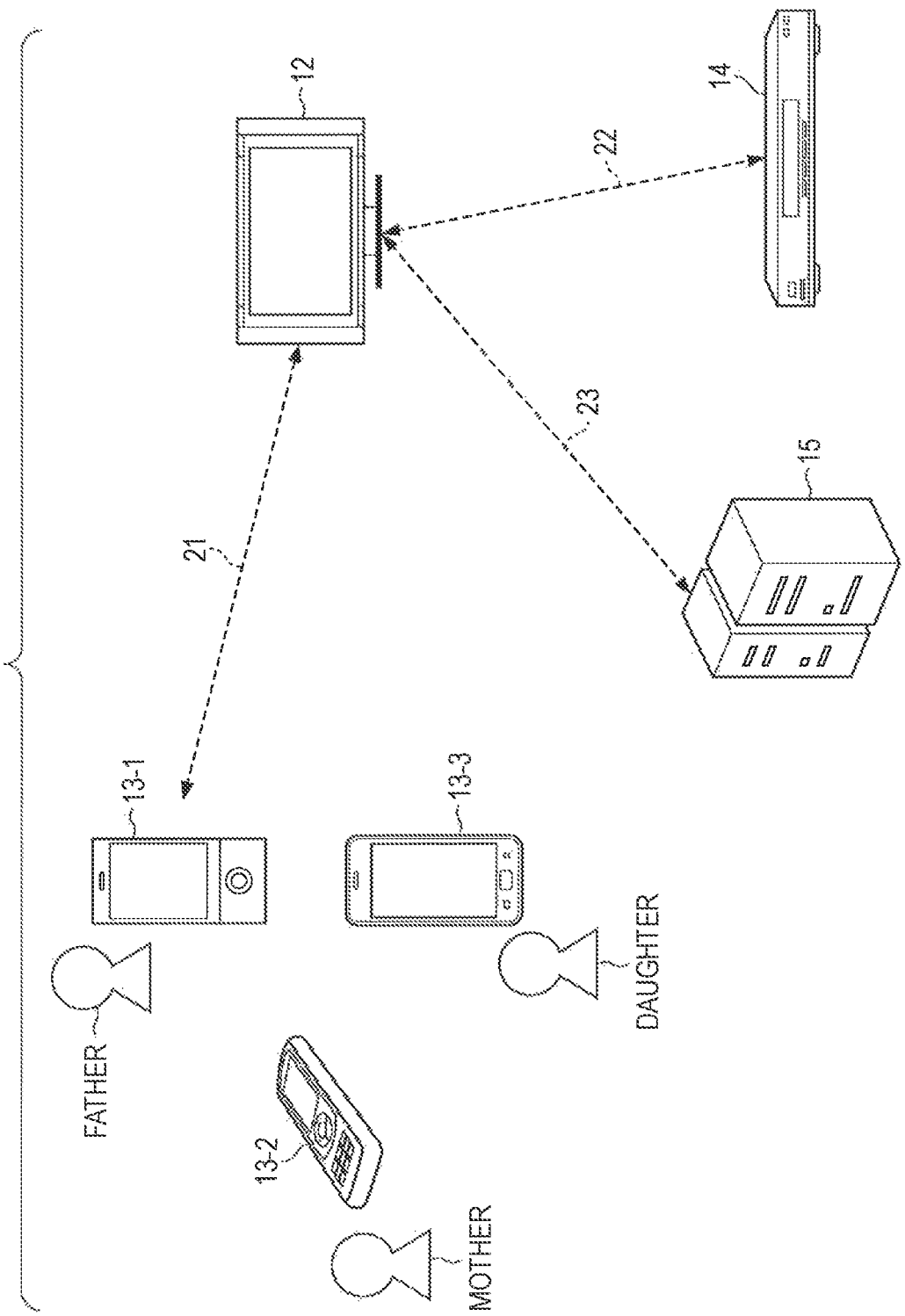
FIG. 5 is a drawing showing an application example of a radio communication system.

In the example of FIG. 5, the receiving device 12, a father's mobile terminal 13-1, a mother's mobile terminal 13-2, and a daughter's mobile terminal 13-3, the recording device 14, and the server 15 are shown. As described above, the receiving device 12 is connected with the mobile terminal 13 (in this case, the mobile terminal 13-1) existing in the communicable range, by the radio communication 22. The receiving device 12 is connected to the recording device 14 by the network 22. In addition, the receiving device 12 is connected to the server 15 by the Internet 23.

Figure 2:
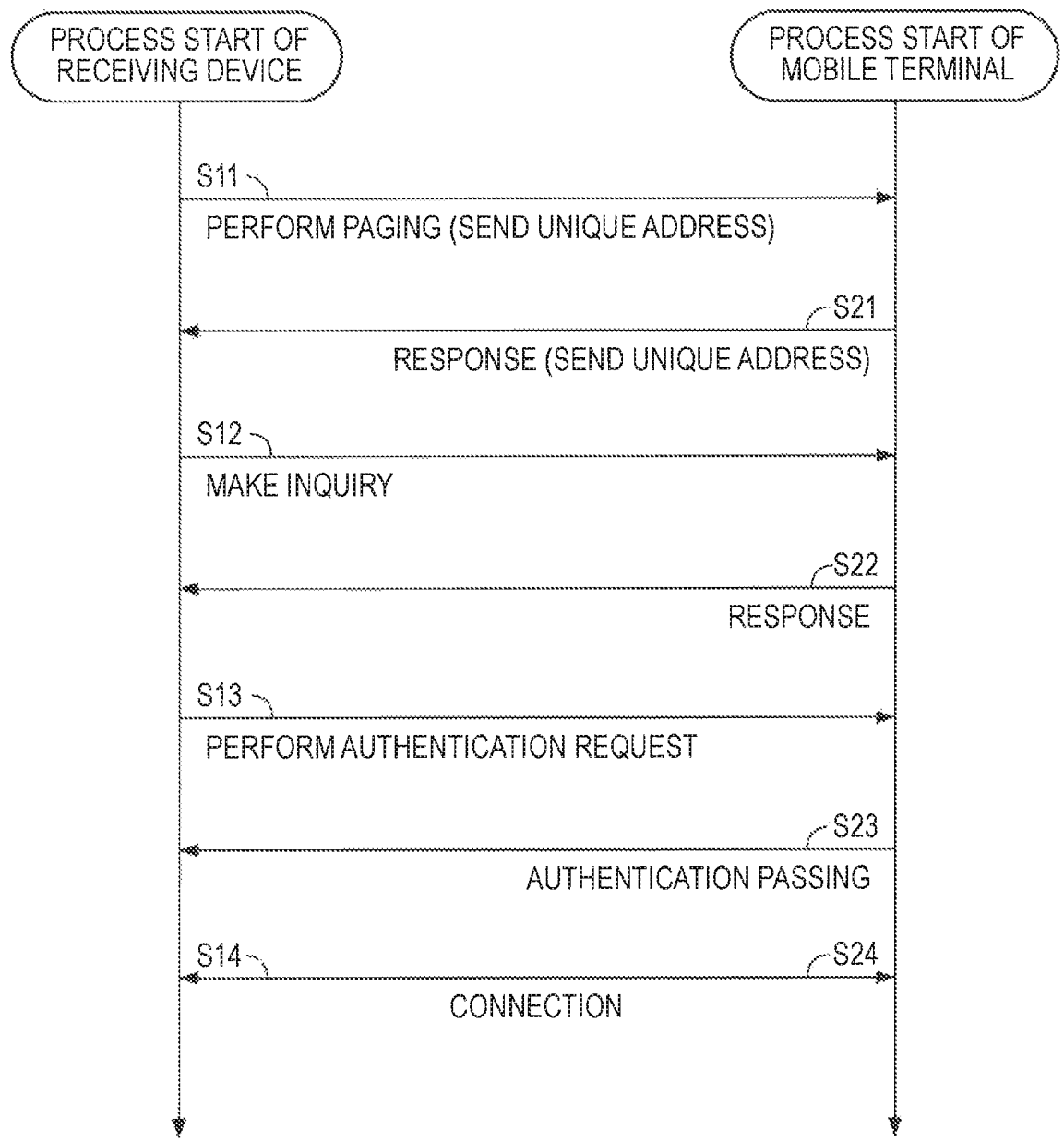
FIG. 2 is a flowchart showing an example of pairing.

The receiving device 12 performs in advance the above-described pairing operation together with the father's mobile terminal 13-1, the mother's mobile terminal 13-2, and the daughter's mobile terminal 13-3 with reference to FIG. 2, and stores a unique address of each of the mobile terminals 13-1 to 13-3 in the unique address storage memory 65 of the connected device. In this instance, user information is associated with each of an address A as father, an address B as mother, and an address C as daughter so as to be stored.

Therefore, for example, as display of two channels is prepared in a case of the proximity of the address A, and display of three channels is prepared in a case of the proximity of the address B, it is possible to change preparation of display in the quick start state using a power supply control by the proximity of the mobile terminal 13, for each user.

In addition, by associating the user with the preference information, for example, when the mobile terminal 13-1 of the address A approaches, connection is performed by the unique address, and that the user is the father may be recognized. Accordingly, the receiving device 12 is connected with the recording device 14 or the server 15, and in the quick start state, prepares content information that is the father's preferences from the connected recording device 14 or the server 15. In addition, when the receiving device 12 is turned on, the prepared information in the quick start state is immediately displayed on the image output unit 53, and therefore it is possible to provide the information (for example, a list or the like) of the content which is the father's preferences to the father that is a user.

Hereinafter, detailed descriptions will be made.

Configuration Example of Receiving Device and Recording Device

Figure 6:
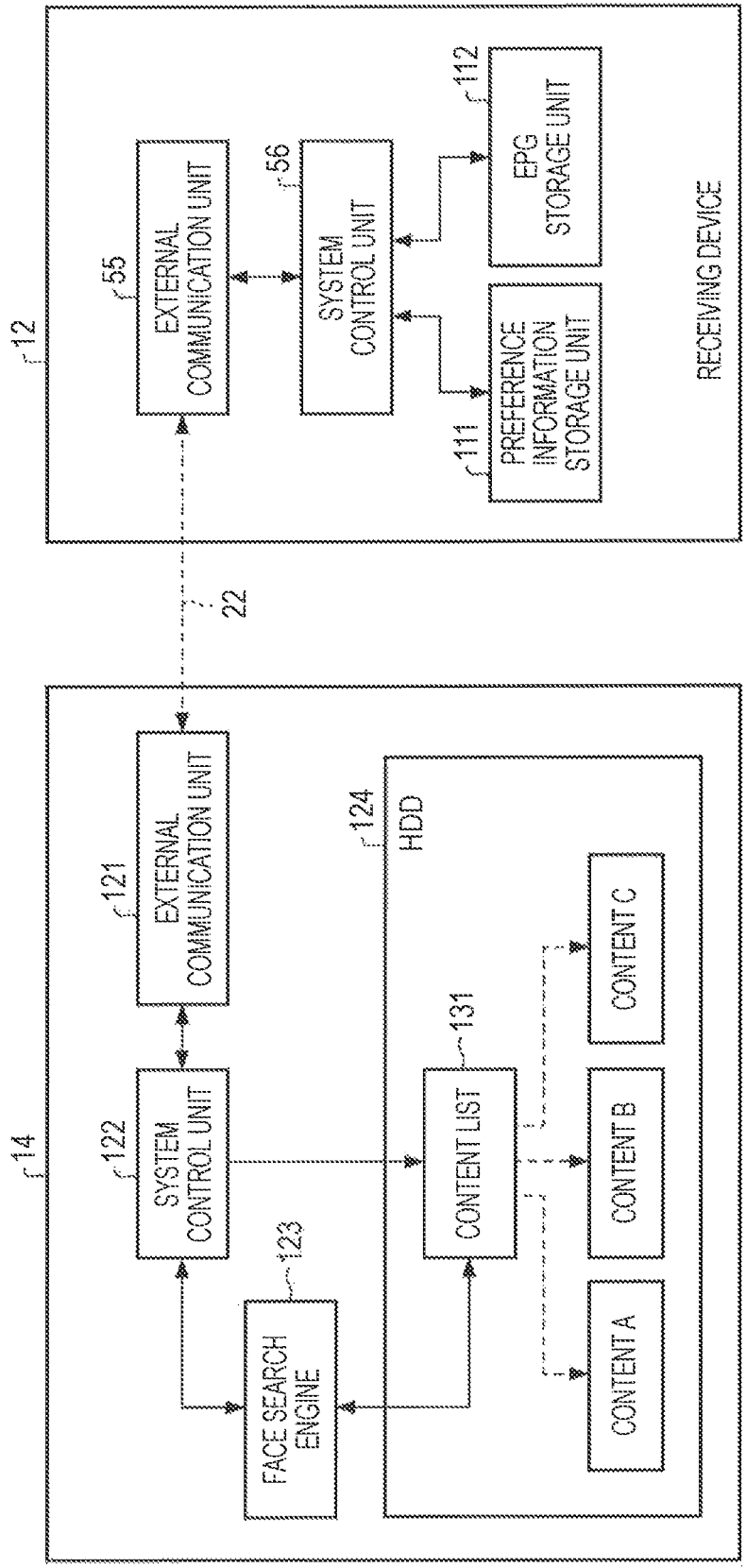
FIG. 6 is a block diagram showing a configuration example of a recording device.

FIG. 6 is a block diagram showing a configuration example of the receiving device 12 and the recording device 14.

The receiving device 12 includes a preference information storage unit 111 and an EPG storage unit 112 in addition to the functional block shown in FIG. 1. In addition, in an example of FIG. 6, the external communication unit 55, the system control unit 56, the preference information storage unit 111, and the EPG storage unit 112 are merely described, but the receiving device 12 may include the functional block shown in FIG. 1. That is, the receiving device 12 includes the tuner 51, the light receiving unit 57, the radio control unit 61, the power supply circuit 66, the preference information storage unit 111, and the EPG storage unit 112.

When the unique address of the approaching mobile terminal 13 is supplied from the radio control unit 61, the system control unit 56 acquires user preference information that is stored in association with the unique address from the preference information storage unit 111.

The system control unit 56 retrieves a user's preferred program (content) from EPG information of the EPG storage unit 112 based on the acquired user preference information. When the user's preferred program is present in the EPG information, the system control unit 56 controls the signal processing unit 52, and in a case of the ON state, performs preparation of display so that a list of the user's preferred programs is displayed. Alternatively, when the user's preferred program exists among the EPG information, the system control unit 56 controls the tuner, and in a case of the ON state, performs preparation (selection) of display so that a channel with the user's preferred program is displayed.

In addition, the system control unit 56 sends the acquired user preference information to the recording device 14 by controlling the external communication unit 55, and browses user preference content in the content recorded in the recording device 14. The system control unit 56 supplies information of the content acquired from the recording device 14 via the external communication unit 55 to the signal processing unit 52 to thereby perform preparation of display.

The preference information storage unit 111 stores user preference information in association with the unique address of the mobile terminal 13. The preference information may be stored by a user in advance, or may be acquired from an operation history corresponding to the unique address, which will be described later with reference to FIG. 10.

The EPG storage unit 112 stores EPG (Electronic Program Guide) information that is divided from section data acquired from broadcast signals.

The recording device 14 includes an external communication unit 121, a system control unit 122, a face search engine 123, and a hard disk drive (HDD) 124.

The external communication unit 121 receives preference information transmitted from the receiving device 12, and supplies the received preference information to the system control unit 122. In addition, the external communication unit 121 sends, to the receiving device 12, the information of the content from the system control unit 122.

The system control unit 122 retrieves content in accordance with the preference information from the external communication unit 121 with reference to a content list 131 of the HDD 124. In addition, for example, when the name of a celebrity is present in the preference information from the external communication unit 121, the system control unit 122 may allow the face of the corresponding celebrity to be retrieved from the content list 131 or the content by controlling the face search engine 123. The content list 131 manages the content stored in the HDD 124.

In addition, in an example of FIG. 6, an example in which the receiving device 12 includes the preference information storage unit, but for example, the preference information storage unit may be built in the recording device 14. In this case, the unique address is transmitted from the receiving device 12 to the recording device 14. Example of preference information storage unit FIG. 7 is a drawing showing an example of the preference information storage unit 111. In the example of FIG. 7, the preference information storage unit 111 is composed of a unique address and user information and preference information which are stored in association with the unique address.

The user being the father and the father's preference information being golf and name of professional golfer are stored in association with the unique address A.

In the unique address B, the user being the mother and the mother's preference information being Korea, dramas, and name of actor are stored.

In the unique address C, the user being the daughter and the daughter's preference information being song, comedy, and name of idol are stored.

Example of Process of Shifting to Quick Start State

Figure 8:
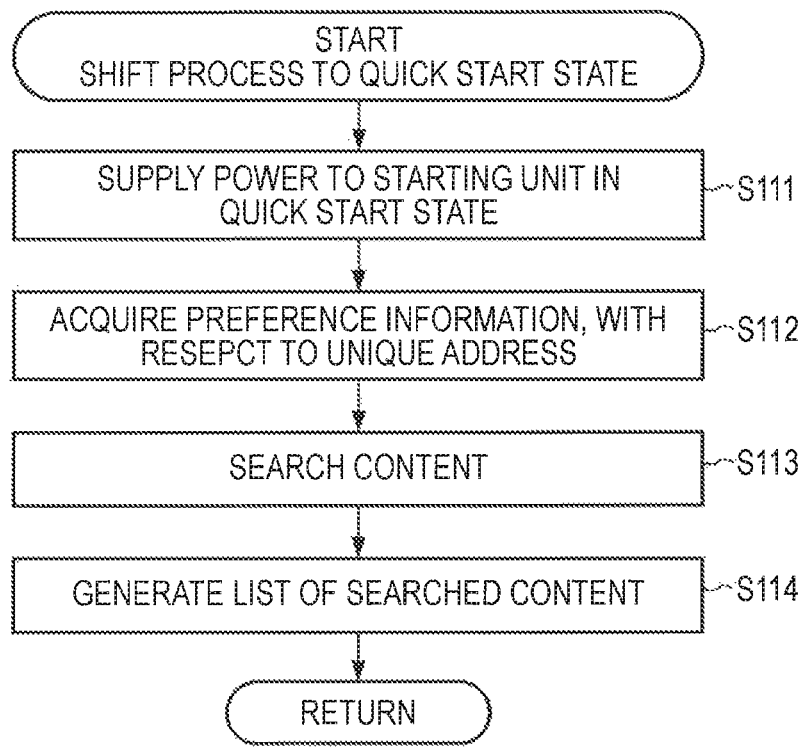
FIG. 8 is a flowchart showing a process of shifting to a quick start state.

Next, a process of shifting a standby state of a power supply state to a quick start state will be described with reference to a flowchart of FIG. 8. In addition, the process of FIG. 8 is an example of the process of the shifting to the quick start state in step S55 when determined as YES in step S60 of FIG. 4 described above.

The radio control unit 61 supplies power to the starting unit in the quick start state by controlling the power control unit 62 in step S111. That is, in the standby state, power is supplied from the power supply circuit 66 to the radio control unit 61, the power control unit 62, the radio circuit 63, the unique address storage memory 64, the unique address storage memory 65 of the connected device, and the power supply circuit 66. Accordingly, in the quick start state, power is further supplied from the power supply circuit 66 to the tuner 51, the signal processing unit 52, the external communication unit 55, the system control unit 56, the light receiving unit 57, the preference information storage unit 111, and the EPG storage unit 112.

In addition, in this instance, the radio control unit 61 supplies the detected unique address of the mobile terminal to the system control unit 56.

In step S112, the system control unit 56 acquires preference information from the preference information storage unit 111 in association with the unique address from the radio control unit 61. For example, "golf, name of golfer which are father's preference information are acquired in association with the unique address A.

The system control unit 56 sends the acquired preference information to the recording device 14 via the external communication unit 55, and in step S113, enables the recording device 14 to retrieve content.

That is, the external communication unit 121 supplies the preference information from the receiving device 12, to the system control unit 122. The system control unit 122 retrieves content in accordance with the preference information from the external communication unit 121 with reference to the content list 131 of the HDD 124. For example, content information about golf or name of golfer may be retrieved. The system control unit 122 transmits the information of the content which are the results retrieved with reference to the content list 131, via the external communication unit 121.

In addition, for example, in the HDD 124, it is possible to set access limitations on such content not to be seen by others to thereby enabling permission to be granted through the unique address. In addition, for example, it is possible to exclude content without access limitations to persons other than the father, from a retrieval target of the content in the unique addresses other than the unique address of the father's mobile terminal 13-1.

Figure 9:
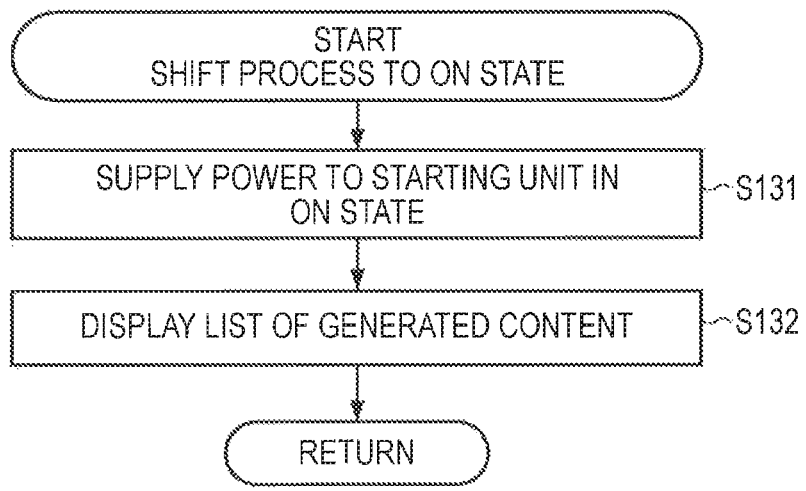
FIG. 9 is a flowchart showing a process of shifting to an ON state.

In step S114, when acquiring the information of the content from the recording device 14 via the external communication unit 55, the system control unit 56 generates a list of the retrieved content using the acquired content information by controlling the signal processing unit 52. As described above, in the case of the ON state in the quick start state, the list of the content is generated as preparation for displaying on the image output unit 53. Example of process of shifting to ON state A process of shifting to the ON state from the quick start state of the power supply state will be described with reference to the flowchart of FIG. 9. In addition, the process of FIG. 8 is an example of the process of the shifting to the ON state in step S51 when determined as YES in step S56 of FIG. 4 described above.

In step S131, the radio control unit 61 supplies power to the starting unit in the ON state by controlling the power control unit 62. That is, in the quick start state, power is supplied from the power supply circuit 66 to the radio control unit 61, the power control unit 62, the radio circuit 63, the unique address storage memory 64, the unique address storage memory 65 of the connected device, and the power supply circuit 66. In addition, power is supplied from the power supply circuit 66 to the tuner 51, the signal processing unit 52, the external communication unit 55, the system control unit 56, the light receiving unit 57, the preference information storage unit 111, and the EPG storage unit 112.

Accordingly, in the ON state, power is further supplied from the power supply circuit 66 to the image output unit 53 and the audio output unit 54.

In step S114 of FIG. 8, the signal processing unit 52 generates a list of content as preparation of display in the case of the ON state. When power is supplied to the image output unit 53, the signal processing unit 52 provides the generated list of the content to the image output unit 53.

Corresponding to this, in step S132, the image output unit 53 displays the generated list of the content.

As described above, the proximity of the father's mobile terminal 13-1 is detected by the unique address, the power supply state is shifted to the quick start state, and the list of the content retrieved based on the father's preference information is prepared, and therefore the prepared list of the content is displayed when the power supply state is shifted to the ON state.

Accordingly, it is possible to propose a view of recommended content in accordance with user preference information.

In addition, in the above description, an example in which the list of recommended content in accordance with the preference information is displayed has been described, but a program may be retrieved from the EPG information in accordance with the preference information, and the program may be displayed when the power supply state is shifted to the ON state.

In the above description, an example in which the list of recommended content is displayed in the ON state has been described. On the other hand, for example, by making it as a start for content to be retrieved in step S113 of FIG. 8, the power supply state of the receiving device 12 is shifted to the ON state, so that the generated list of the content may be displayed.

In the above description, an example in which the instruction to the receiving device 12 is input by operating the remote controller towards the light receiving unit 57 by a user has been described, but the instruction to the receiving device 12 may be input by the radio communication 21 by operating the mobile terminal 13.

That is, other than the infrared rays, controls, for example, using the mobile terminal 13 whose proximity is detected, such as channel switching by the radio communication 21 or audio adjustment may be performed.

In FIG. 10, the receiving device 12 performs the pairing described with reference to FIG. 2, and detects the father's mobile terminal 13-1 and the mother's terminal 13-2. In this case, the receiving device 12 receives the instruction such as channel switching through the radio communication 21 or audio adjustment from the mobile terminals 13-1 and 13-2.

Specifically, operation signals of channel switching of the receiving device 12 of a user are input to the system control unit 85 via a touch panel or the like provided in the mobile terminal 13-1. The system control unit 85 sends the operation signals via the radio circuit 81 by controlling the radio control unit 82. In this instance, the radio control unit 82 also sends its own unique address stored in the unique address storage memory 83.

The radio control unit 61 receives the unique address and the operation signals via the radio circuit 63 and supplies the received information to the system control unit 56, and the system control unit 56 determines whether the unique address is a unique address of the detected mobile terminal 13-1. When the unique address is determined to be the unique address of the detected mobile terminal 13-1, the system control unit 56 instructs the tuner 51 to perform channel switching corresponding to the operation signals.

In this manner, it is possible to control the receiving device 12 using the mobile terminal 13 other than the remote controller dedicated to the receiving device 12.

As the operation, other than channel switching and audio adjustment, for example, content retrieval or viewing or recording reservation may be possible. The type of the operation is not limited thereto.

Therefore, an operational history may be accumulated for each unique address, and therefore it is possible to update preference information of the preference information storage unit 111 based on the accumulated operational history.

In addition, due to communication using the unique address, it is possible to prevent occurrence of overlapped operations or collision with other users.

In addition, unlike infrared rays, there is no limitation on the range or direction of communication without being affected by disconnection when the communication is in a range of intensity of radio waves.

In addition, by providing priority to the unique addresses, priority may be provided to the operated mobile terminal. For example, by dividing times with high priority, the mobile terminal with high priority may be changed at regular time intervals. Therefore, for example, it is possible to respond to a channel conflict or the like.

In addition, in the above description, in the receiving device 12, an example in which the recommended content is generated for each unique address of the mobile terminal 13, that is, for each user to thereby perform preparation of display has been described. On the other hand, the preparation of display may be performed using the unique address without being limited to each user, for example, for each vendor or for each model of the mobile terminal.

Example of Unique Address

FIG. 11 shows an example of a unique address.

The above-described unique address is composed of a non-significant address part (NAP), an upper address part (UAP), and a lower address part (LAP). The NAP is 16 bits, the UAP is 8 bits, and the LAP is 24 bits.

NAP+UAP is a unique identification (ID) of a vendor called an organizationally unique identifier (OUI), and is managed by the IEEE standard, so that each vendor acquires its own company number by applying to the IEEE.

Except for a portion of the addresses (0x9E8B00-0x9E8B3F), the LAP may be freely allocated by each vendor.

Therefore, in the receiving device 12, a content list or the like is generated for each unique address so as to perform preparation of display, but for example, preparation of different displays may be performed for each vendor using NAP+UAP.

In addition, for example, in a case in which allocation of the LAP is divided for each device (for example, a case in which product IDs are divided at high-order 8 bits of the LAP), preparation of different displays for each product of vendors may be performed. In this case, in association with a part (for example, high-order 8 bits of the LAP) of the unique address, information provided to a user is stored in, for example, a provision information storage unit.

Therefore, for example, a product of "high-order 8 bits of the LAP=89 in a vendor of NAP+UAP=01:23:45" is a tablet terminal of x company, and therefore it is possible to recommend this movie or transmit this movie to the user having the product.

In addition, in the above description, an example of using the receiving device has been described, but the present disclosure is not limited to the receiving device. The present disclosure may be applied to an electronic device which is able to perform control of power supply.

The above-described series of processes may be performed by hardware or software. When performing the series of processes by software, a program constituting the software is installed in a computer. Here, in the computer, a computer with dedicated hardware built therein or a general-purpose personal computer that is able to execute a variety of functions may be included.

Configuration Example of Computer

Figure 12:
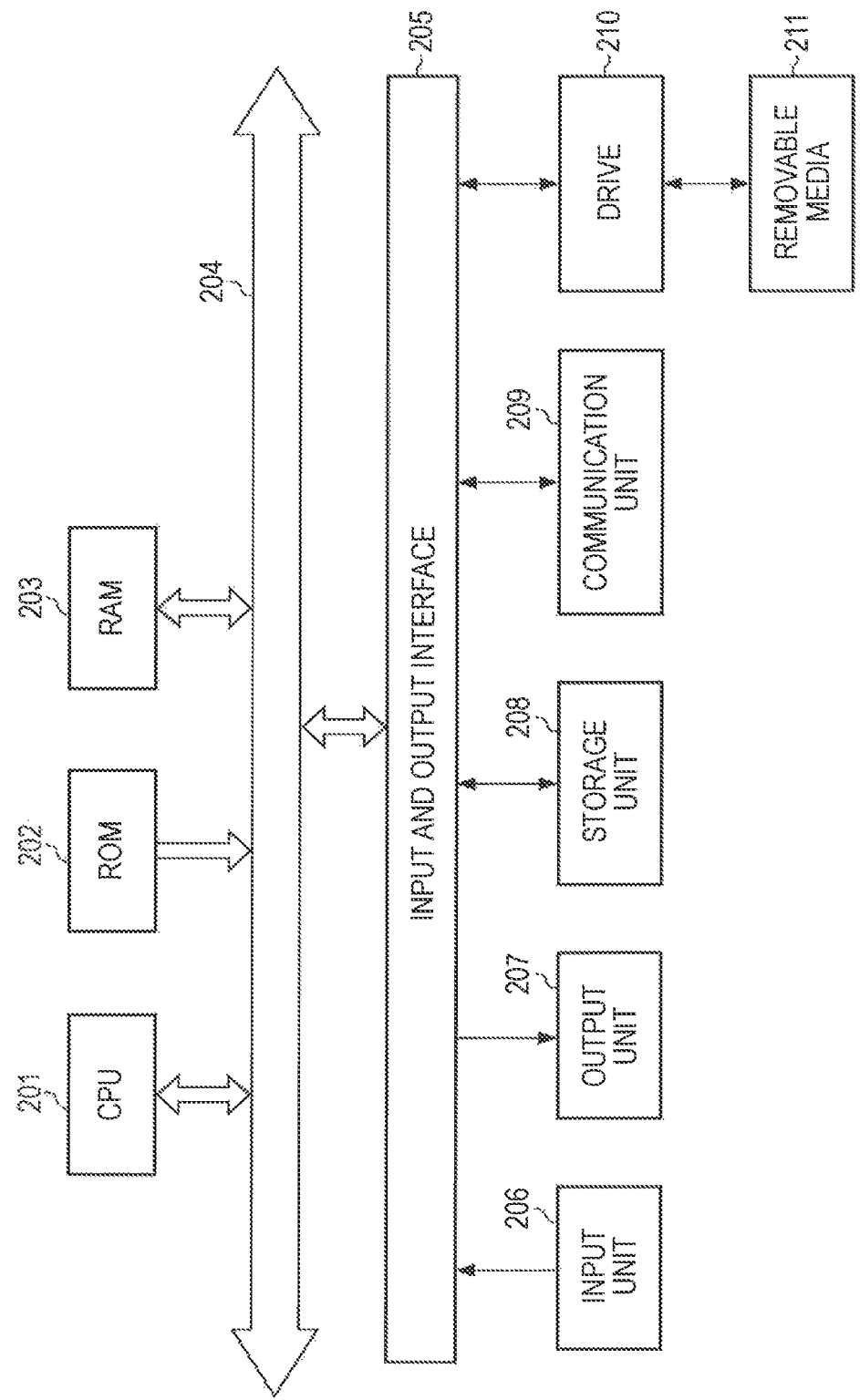
FIG. 12 is a block diagram showing a configuration example of a computer.

FIG. 12 shows a configuration example of hardware of a computer that executes the above-described series of processes by a program.

In a computer, a Central Processing Unit (CPU) 201, a Read Only Memory (ROM) 202, a Random Access Memory (RAM) 203 are connected with each other by a bus 204.

In addition, an input and output interface 205 is connected to the bus 204. An input unit 206, an output unit 207, a storage unit 208, a communication unit 209, and a drive 210 are connected to the input and output interface 205.

The input unit 206 includes a keyboard, a mouse, a microphone, or the like. The output unit 207 includes a display, a speaker, or the like. The storage unit 208 includes a hard disk, a nonvolatile memory, or the like. The communication unit 209 includes a network interface or the like.

The drive 210 drives a magnetic disk, an optical disc, a magneto-optical disc, or removable media 211 of a semiconductor memory.

In the computer configured as above, the CPU 201 loads a program stored in the storage unit 208 via the input and output interface 205 and the bus 204 by loading the program into the RAM 203, and performs the above-described series of processes.

The program executed by the computer (CPU 201) may be provided which is recorded on the removable media 211 as package media or the like. In addition, the program may be provided via a wired or wireless transmission medium such as a local, area network, the Internet, or a digital satellite broadcast.

In the computer, the program may be installed in the storage unit 208 via the input and output interface 205, by mounting the removable media 211 in the drive 210. In addition, the program may be received from the communication unit 209 via a wired or wireless transmission medium so as to be installed in the storage unit 208. In addition, the program may be installed in the ROM 202 or the storage unit 208 in advance.

In addition, the program executed by the computer may be a program that performs a process in time series along the order described in the present specification, or a program that performs a process at necessary timing such as when a call is made.

In addition, in the present specification, steps that describe the above-described series of processes may include even a process performed in parallel or individually although not performed in time series, in addition to a process performed in time series along the described order.

In addition, an embodiment of the present disclosure is not limited to the above-described embodiments, and may be variously changed without departing from the scope of the present disclosure.

For example, the present disclosure may have a cloud computing configuration in which a single function may be shared and commonly processed in a plurality of devices via a network.

In addition, each step described using the above-described flowchart may be performed in a single device, and may be performed which are divided to a plurality of devices.

In addition, when a plurality of processes are included in a single step, the plurality of processes included in the single step may be performed in a single device, and may be performed which are divided to a plurality of devices.

In addition, as described above, a configuration described as a single device (or processing unit) is separated, so that a configuration described as a plurality of devices (or processing unit) may be used. On the contrary, in the above description, the configuration described as a plurality of devices (or processing unit) is summarized, so that a configuration described as a single device (or processing unit) may be used. In addition, a configuration other than the above-described configurations may be added to a configuration of each device (or each processing unit). Furthermore, when configurations or operations of the entire system are substantially the same, a part of a configuration of any device (or processing unit) may be included in configurations of other devices (or other processing units). That is, the present disclosure is not limited to the above-described embodiments, and may be variously changed without departing from the scope of the present disclosure.

As above, preferred embodiments of the present disclosure have been described with reference to the accompanying drawings, but are not limited to the described examples.

It should be understood by those skilled in the art that various modifications, combinations, sub-combinations and alterations may occur depending on design requirements and other factors insofar as they are within the scope of the appended claims or the equivalents thereof.

In addition, the present disclosure may have the following configuration.

(1) An electronic device including:
an address acquisition unit that performs communication with an approaching communication terminal to acquire a unique address of the communication terminal; and
a power control unit that shifts its own power state from a standby state where power is supplied only to a minimum function to a quick start state where power is supplied to a function other than a presentation function to a user, when the unique address acquired by the address acquisition unit matches a registered address.

(2) The electronic device described in the above (1), wherein when a user operation is performed after its own power state is shifted to the quick start state, the power control unit shifts its own power state to an ON state where power is supplied to all functions.

(3) The electronic device described in the above (1) or (2), wherein when its own power state is shifted to the quick start state and then the user operation is not performed for a predetermined time, the power control unit shifts its own power state to the standby state.

(4) The electronic device described in any one of the above (1) to (3), wherein, when its own power state is shifted to the ON state and then the communication with the communication terminal is disconnected, the power control unit shifts its own power state to the quick start state.

(5) The electronic device described in any one of the above (1) to (4) further includes
a preference information storage unit that stores user preference information in association with the unique address of the communication terminal; and
an information providing unit that extracts information in accordance with the user preference information stored in the preference information storage unit in association with the acquired unique address when the unique address acquired by the address acquisition unit matches the registered address, and provides the extracted information when its own power state is shifted to the ON state by the user operation.

(6) The electronic device described in any one of the above (1) to (4) further includes
a provision information storage unit that stores information providing to the user in association with a part of the unique address of the communication terminal; and
an information providing unit that extracts the information stored in the provision information storage unit in association with a part of the acquired unique address when the unique address acquired by the address acquisition unit matches the registered address, and provides the extracted information when its own power state is shifted to the ON state by the user operation.

(7) The electronic device described in any one of the above (1) to (6), wherein the presentation function to the user is an image display unit that displays an image and a audio output unit that outputs a audio.

(8) A power control method including:
performing, by an electronic device, communication with an approaching communication terminal to acquire a unique address of the communication terminal; and
shifting its own power state from a standby state where power is supplied only to a minimum function to a quick start state where power is supplied to a function other than a presentation function to a user, when the acquired unique address matches a registered address.

(9) A program which makes a computer function as:

an address acquisition unit that performs communication with an approaching communication terminal to acquire a unique address of the communication terminal; and a power control unit that shifts its own power state from a standby state where power is supplied only to a minimum function to a quick start state where power is supplied to a function other than a presentation function to a user, when the unique address acquired by the address acquisition unit matches a registered address.

The invention claimed is:

1. An electronic device comprising:
   an address acquisition unit that performs communication with a communication terminal to acquire an address of the communication terminal which is provided by a wireless function;
   a power control unit that shifts its own power state from a standby state where power is supplied only to a minimum function to a quick start state where power is supplied to a function other than a presentation function to a user and is not supplied to a function that is a presentation function to the user, when the address acquired by the address acquisition unit matches a registered address, wherein, when a user operation is performed after its own power state is shifted to the quick start state, the power control unit shifts its own power state to an ON state where power is supplied to each unit that is started in the quick start state and at least one additional unit;
   a preference information storage unit that stores user preference information in association with the address of the communication terminal; and
   an information providing unit that, when the power control unit is in the quick start state, extracts information in accordance with the user preference information stored in the preference information storage unit in association with the acquired address when the address acquired by the address acquisition unit matches the registered address, and provides the extracted information when its own power state is shifted to the ON state by the user operation.

2. The electronic device according to claim 1, wherein the wireless function is Bluetooth.

3. The electronic device according to claim 1, wherein the wireless function is WiFi.

4. The electronic device according to claim 1, wherein, when its own power state is shifted to the quick start state and then the user operation is not performed for a predetermined time, the power control unit shifts its own power state to the standby state.

5. The electronic device according to claim 1, wherein, when its own power state is shifted to the ON state and then the communication with the communication terminal is disconnected, the power control unit shifts its own power state to the quick start state.

6. The electronic device according to claim 1, wherein the presentation function to the user is an image display unit that displays an image and an audio output unit that outputs an audio.

7. A power control method comprising:
   performing, by an electronic device, communication with a communication terminal to acquire an address of the communication terminal; and
   shifting an own power state of a power control unit of the electronic device from a standby state where power is supplied only to a minimum function to a quick start state where power is supplied to a function other than a presentation function to a user and is not supplied to a function that is a presentation function to the user, when the acquired address matches a registered address, wherein, when a user operation is performed after the own power state is shifted to the quick start state, the own power state is shifted to an ON state where power is supplied to each unit that is started in the quick start state and at least one additional unit;
   when the power control unit is in the quick start state, extracting information in accordance with user preference information which is stored in association with the address of the communication terminal when the acquired address matches the registered address, and providing the extracted information when the own power state is shifted to the ON state by the user operation.

8. A non-transitory storage medium on which is recorded a program which causes a computer to function as:
   an address acquisition unit that performs communication with a communication terminal to acquire an address of the communication terminal which is provided by a wireless function;
   a power control unit that shifts its own power state from a standby state where power is supplied only to a minimum function to a quick start state where power is supplied to a function other than a presentation function to a user and is not supplied to a function that is a presentation function to the user, when the address acquired by the address acquisition unit matches a registered address, wherein, when a user operation is performed after its own power state is shifted to the quick start state, the power control unit shifts its own power state to an ON state where power is supplied to each unit that is started in the quick start state and at least one additional unit;
   a preference information storage unit that stores user preference information in association with the address of the communication terminal; and
   an information providing unit that, when the power control unit is in the quick start state, extracts information in accordance with the user preference information stored in the preference information storage unit in association with the acquired address when the address acquired by the address acquisition unit matches the registered address, and provides the extracted information when its own power state is shifted to the ON state by the user operation.

9. The non-transitory-storage medium according to claim 8, wherein the wireless function is Bluetooth.

10. The non-transitory-storage medium according to claim 8, wherein the wireless function is WiFi.

11. An electronic device comprising:
    an address acquisition unit that performs communication with a communication terminal to acquire an address of the communication terminal which is provided by a wireless function;
    a power control unit that shifts its own power state from a standby state where power is supplied to less function than a quick start state where power consumption is larger than the standby state, when the address acquired by the address acquisition unit matches a registered address, wherein in the standby state power is supplied to at least the power control unit and a radio control unit, and power is not supplied to a function that is a presentation function to a user, wherein, when a user operation is performed after its own power state is shifted to the quick start state, the power control unit shifts its own power state to an ON state where power is supplied to each unit that is started in the quick start state and at least one additional unit;

a preference information storage unit that stores user preference information in association with the address of the communication terminal; and an information providing unit that, when the power control unit is in the quick start state, extracts information in accordance with the user preference information stored in the preference information storage unit in association with the acquired address when the address acquired by the address acquisition unit matches the registered address, and provides the extracted information when its own power state is shifted to the ON state by the user operation.

12. The electronic device according to claim 11, wherein the radio control unit performs pairing in advance by the wireless function.

13. The electronic device according to claim 11, wherein the wireless function is Bluetooth.

14. The electronic device according to claim 11, wherein the wireless function is WiFi.

15. The electronic device according to claim 11, wherein the ON state is a state where the electronic device is started to provide an image or audio to a user.

16. The electronic device according to claim 15, wherein a program is displayed when the power supply state is shifted to the ON state.

17. The electronic device according to claim 15, wherein a content list is displayed when the power supply state is shifted to the ON state.

18. The electronic device according to claim 15, wherein channel switching or audio adjustment is performed by radio communication from a mobile terminal.

19. The electronic device according to claim 1, wherein the power control unit is configured such that when the power control unit is turned off by a main power termination by the user, the power control unit initially starts in the standby state independent of or prior to determining content of the address acquisition unit.

20. The power control method according to claim 7, wherein the power control unit is configured such that when the power control unit is turned off by a main power termination by the user, the power control unit initially starts in the standby state independent of or prior to determining content of the address acquisition unit.

21. The A non-transitory storage medium according to claim 8, wherein the power control unit is configured such that when the power control unit is turned off by a main power termination by the user, the power control unit initially starts in the standby state independent of or prior to determining content of the address acquisition unit.

22. The electronic device according to claim 11, wherein the power control unit is configured such that when the power control unit is turned off by a main power termination by the user, the power control unit initially starts in the standby state independent of or prior to determining content of the address acquisition unit.

* * * * *